Figure 1:
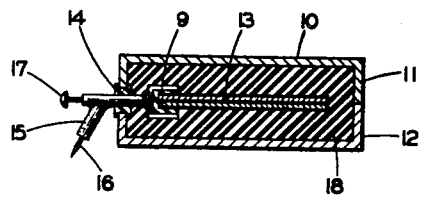

April 29, 1952     T. E. LYNCH     2,594,948
ELECTROMECHANICAL TRANSDUCER UNIT

Filed Oct. 30, 1947     3 Sheets—Sheet 1

*INVENTOR.*
THOMAS E. LYNCH
BY
*Eber J. Hyde*
ATTORNEY

April 29, 1952     T. E. LYNCH     2,594,948
ELECTROMECHANICAL TRANSDUCER UNIT
Filed Oct. 30, 1947     3 Sheets-Sheet 2

INVENTOR.
THOMAS E. LYNCH
BY Ebes J. Hyde
ATTORNEY

April 29, 1952      T. E. LYNCH      2,594,948
ELECTROMECHANICAL TRANSDUCER UNIT Filed Oct. 30, 1947      3 Sheets-Sheet 3

*INVENTOR.*
THOMAS E. LYNCH
BY
ATTORNEY

Patented Apr. 29, 1952

2,594,948

UNITED STATES PATENT OFFICE 2,594,948

ELECTROMECHANICAL TRANSDUCER UNIT

Thomas E. Lynch, Cleveland, Ohio, assignor to The Brush Development Company, Cleveland, Ohio, a corporation of Ohio Application October 30, 1947, Serial No. 783,148

14 Claims. (Cl. 179—100.41)

This invention pertains to a new and novel mounting for a transducer element, such as a piezoelectric crystal element, and more particularly to mounting the transducer element in a semi-solid embedment having particular characteristics.

In the prior art, transducer elements such as piezoelectric crystal elements for phonograph pickups have been enclosed in semi-solid embedment materials such as petroleum jelly (Vaseline), lanolin and the like in order to moisture-proof the crystal and in order to damp resonant vibrations of the transducer system. These crystal elements were contained in a housing and the housing was substantially filled with the semi-solid material. Due to the characteristics of the semi-solid materials which had no stiffness and exerted only a mechanical resistance force against the crystal element throughout its range of vibration it could not act as a mounting means and it was necessary to hold the crystal element within the housing by the usual mounting pads which are well known in the art.

In accordance with this invention there is provided an electromechanical transducer unit for use over a given range of frequencies comprising a transducer element and resiliently yielding mounting means in engagement with the transducer element. The mounting means exert predominantly a stiffness force against the transducer element as the element vibrates at the lower frequencies within the range and exert predominantly a mechanical resistance force against the transducer element as the element vibrates at the higher frequencies within the range. The mounting means, in its preferred form, comprises a mass of resiliently yielding material which has stiffness, and this mass because it has stiffness comprises the sole means for supporting the transducer element against the operating forces which are applied to it.

Alternatively, the mounting means comprises a mass of material in engagement with a large portion of the surface area of the transducer element which exerts a mechanical resistance force against the transducer element as the element vibrates at higher frequencies within the range and means other than the mass of material which exerts a stiffness force against the transducer element as the element vibrates at lower frequencies within the range. The other means may be a spring such as a torsion wire.

An object of the invention is to provide a new and novel mounting for a transducer element.

A further object of the invention is to provide an ideal mounting for a piezoelectric crystal element operating as an electromechanical transducer.

Still another object of the invention is to provide a mounting for a transducer element which effectively moisture-proofs the element and reduces danger to the element due to mechanical shock.

Another object of the invention is to provide a transducer unit, particularly adapted for a phonograph pickup, which is relatively free from acoustic noise and which has high output voltage.

Another object of the invention is to provide a transducer unit, particularly adapted for a phonograph pickup, which has internal equalization.

It is also an object of the invention to provide a mounting for a piezoelectric crystal element which is devoid of mounting pads.

A further object of the invention is to provide a replaceable phonograph pickup cartridge whose permanent stylus is easily replaceable.

Another object of the invention is to provide a phonograph pickup stylus which is protected against damage due to rough handling.

Still another object of the invention is to provide a phonograph pickup whose static and dynamic stylus forces are reduced to a minimum.

A further object of the invention is to provide a transducer unit, particularly adapted for a phonograph pickup, which reduces pickup and tone arm resonances to a minimum.

Still another object of the invention is to provide a piezoelectric phonograph pickup which will operate over a long period of time in a hot, humid climate.

Figure 2:
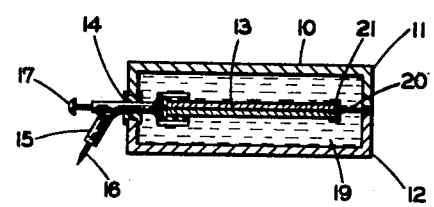
Figure 3:
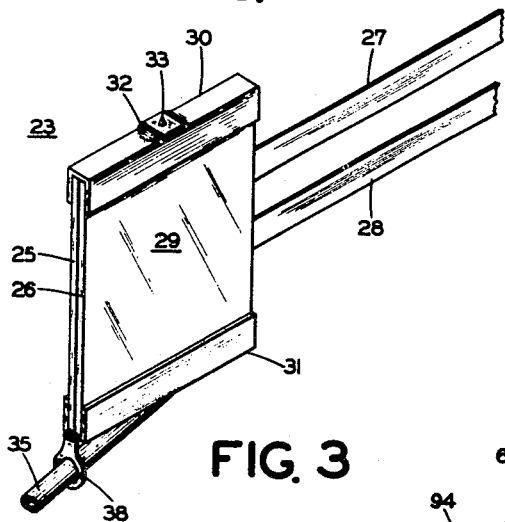
Figure 4:
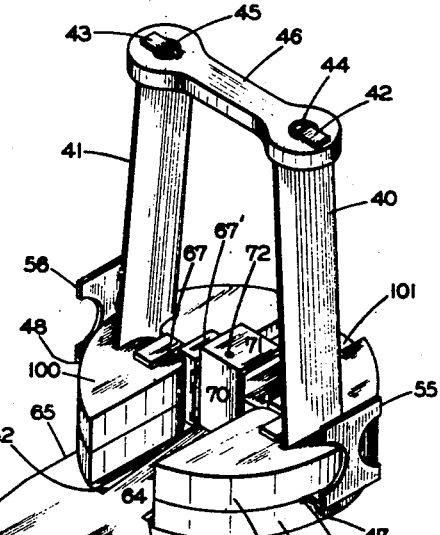
Figure 6:
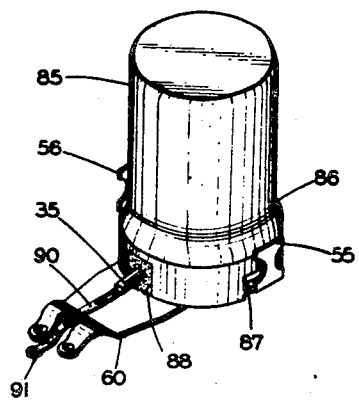
Figure 5:
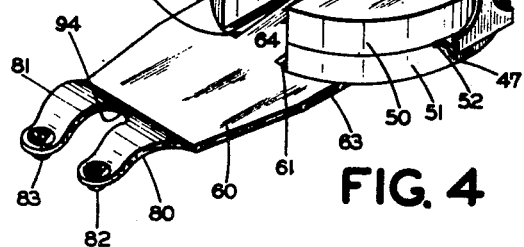
Figure 7:
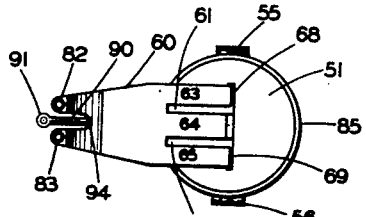
Figure 8:
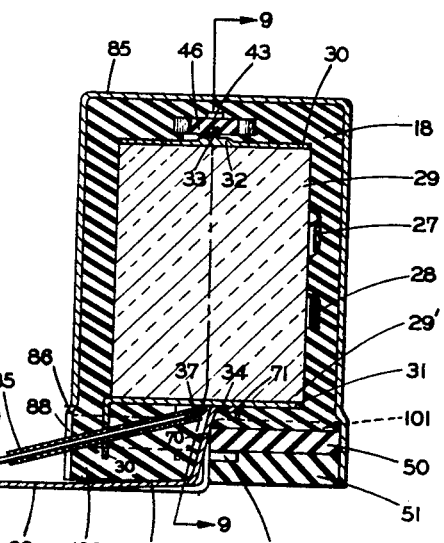
Figure 9:
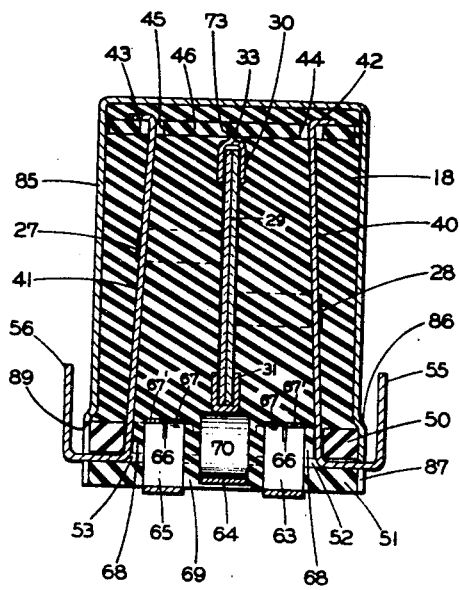
Figure 13:
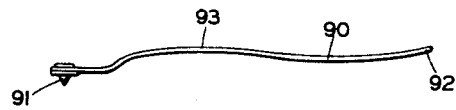
Figure 14:
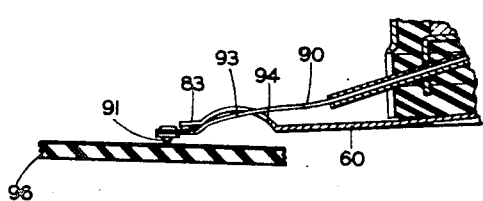
Figure 10:
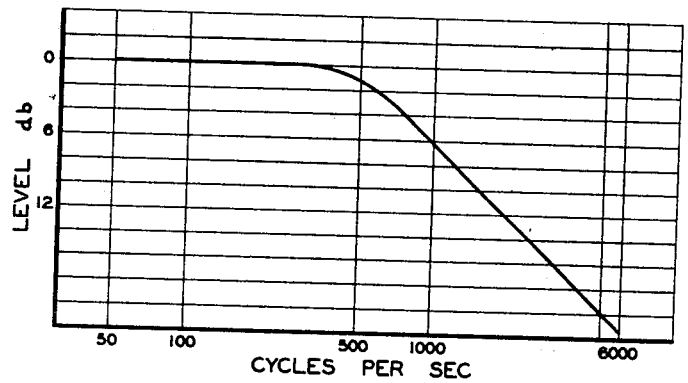
Figure 11:
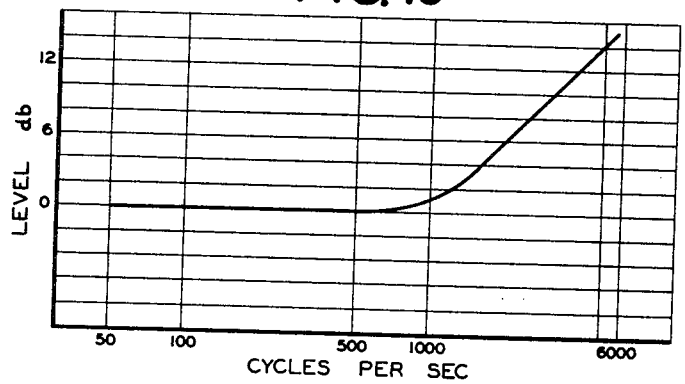
Figure 12:
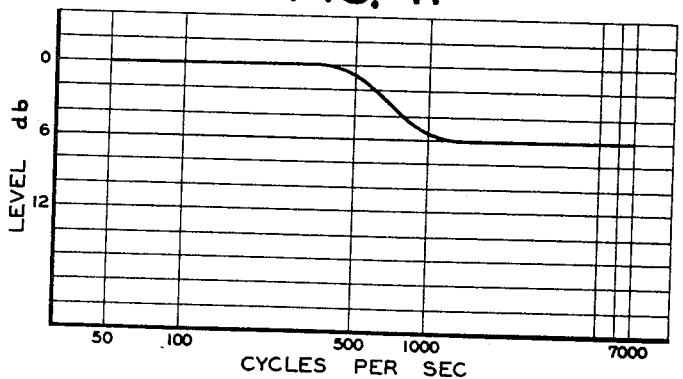

Other objects and a fuller understanding of the invention may be had by referring to the following description, claims and drawings wherein:

Fig. 1 is a cross-sectional schematic view illustrating one form of the invention; Fig. 2 is a cross-sectional schematic view illustrating another form of the invention; Fig. 3 is an isometric view of the crystal portion of a device embodying the invention; Fig. 4 is an isometric view of a harness assembly for holding the crystal shown in Fig. 3; Fig. 5 is a top view of the assembled device; Fig. 6 is an isometric view of the assembled device; Fig. 7 is a bottom view of the device shown in Figs. 5 and 6; Fig. 8 is a sectional view taken along line 8—8 of Fig. 5; Fig. 9 is a sectional view taken along line 9—9 of Figs. 5 and 8; Fig. 10 is a graph showing the unequalized output from one type of commercial phonograph record; Fig. 11 is a graph showing the unequalized output of a phonograph pickup embodying the invention; Fig. 12 is a graph showing the unequalized output of a phonograph pickup embodying the invention when reproducing a commercial phonograph record; Fig. 13 is a side view of the phonograph stylus assembly; and Fig. 14 is a sectional side view of a portion of the pickup showing the stylus in engagement with a phonograph record.

In Fig. 1 there is shown a housing 10 comprised of two housing portions 11 and 12 connected together by suitable means (not shown) and containing an electromechanical transducer 13, such for example as a multiplate flexing-type piezo-electric crystal element which is well known to the art. Extending through the rubber grommet 14 at one end of the housing 10 is a phonograph needle chuck, indicated generally by the reference character 15. A phonograph stylus 16 is connected into the chuck 15 by suitable means, such as the screw 17, and the chuck 15 is connected to the crystal 13 by means of a yoke 9.

Within the housing 10 there is a resiliently yielding mass of rubber-like material 18 contacting a broad area of the crystal and exerting a stiffness force against the crystal 13 as the crystal is twisted by a phonograph record groove laterally moving the tip of the stylus 16. Because the material 18 is compliant and yieldingly tends to hold the crystal in place, a force applied to the chuck end of the crystal 13 stresses the crystal and causes the crystal to generate an electromotive force representative of the mechanical force applied to the crystal. Contrary to the prior art, no mounting pads or other means for forcibly restraining localized portions of the crystal element 13 are utilized.

The material 18, when properly chosen in accordance with specifications presented later, acts as a stiffness-controlled mounting for the piezoelectric crystal element 13 at frequencies below a certain frequency which varies in accordance with its composition. With the crystal element vibrating at frequencies up to this certain frequency, a force potential independent of frequency is produced across the length of the crystal element causing the element to generate a voltage which is also independent of frequency. Such a voltage output is illustrated by the horizontal portion of the graph shown in Fig. 11 where the certain frequency is about 700 cycles per second. At frequencies above this certain frequency the material 18, because of its molecular friction, begins to act as a mechanical resistance to the motion of the crystal element so that the crystal element now has produced across its length a force potential proportional to the frequency of its vibration. This generates for a given amplitude of stylus displacement a voltage output rising at a rate of about 6 db./octave starting at the certain frequency. This rising output is illustrated by the upwardly turned portion of the graph shown in Fig. 11. If the mounting material 18 has somewhat more internal friction the pickup response can be made to start rising at a lower frequency, and if it has somewhat less internal friction the pickup response can be made to start rising at a higher frequency. The point at which the pickup response starts to rise may, by analogy to the terms used in the phonograph art, be called the "turn-over" point. Below the "turn-over" point the force exerted against the crystal element by the material 18 is predominantly a stiffness force although there may also be exerted a mechanical resistance force. Above the "turn-over" point the force is predominantly a mechanical resistance force although there may also be a stiffness force exerted.

Commercial phonograph records are usually cut constant amplitude up to about 400 cycles per second and constant velocity above that frequency. If such a record is reproduced by a phonograph pickup having no equalization an output response flat to about 400 cycles per second (the "turn-over" point) is obtained, and the response thereafter falls at a rate of about 6 db./octave. Fig. 10 illustrates by a graph the output voltage from a phonograph pickup reproducing such a record. Fig. 12 is a graph showing the output voltage from a phonograph pickup embodying the present invention as the pickup reproduces a commercial phonograph record. The output is flat to about 400 cycles and falls at a rate of about 6 db./octave between 400 and 700 cycles. At this frequency the output becomes flat and stays flat to well out beyond 7,000 cycles. This provides, without any electrical equalization, a base boost which for many applications is desirable.

The material 18 within the housing 10 very effectively seals the transducer element 13 against moisture. It further provides a very effective shock mount thereby, if it is so desired, permitting the use of very thin, fragile, multiplate crystal elements. In addition to providing an excellent mounting and in addition to providing internal equalization the material 18 also damps resonances which may occur in the crystal or in the crystal system comprising the crystal element 13 and the chuck 15. Accordingly, as is seen from the graph in Fig. 12, a very flat frequency response is obtained which has no peaks to bother the critical listener.

Fig. 2 illustrates another form of the invention wherein the rubber-like material 18 is replaced by a semi-solid or fluid material 19 such, for example, as oil, petroleum jelly, lanolin or the like, and the end of the transducer element 13 opposite the chuck 15 is connected to the housing 10 by means of a torsion wire 20 or other such compliant means. One end of the torsion wire 20 is clamped rigidly between the top portion 11 and the bottom portion 12 of the housing 10 and the other end of the torsion wire 20 is rigidly connected to the transducer element 13 by means of a clamp 21. As the chuck 15 vibrates thereby twisting the front end of the transducer 13 the back end of the transducer is resiliently restrained by the torsion wire 20. The material 19 which fills the housing 10 and is in engagement with the transducer element 13 substantially throughout its entire area is non-compliant, but at frequencies—say above about 700 cycles per second—it begins to exert an effective mechanical resistance force against the vibration of the transducer element 13. By proper selection of the material 19 and of the torsion wire 20 the output of the pickup shown in Fig. 2 can be made to approximate the output of the pickup shown in Fig. 1.

Satisfactory results from a phonograph pickup of the type shown in Fig. 1 are obtained if the materials 18 is of the plasticized polyvinyl resin type. One such material is sold under the trade name Korogel. Rubber-like plastic elastomers of the vinylite type are also satisfactory. One such elastomer is made by copolymerizing polyvinyl chloride and polyvinyl acetate and dispersing the resultant resin in a plasticizer such as dibutyl or dioctal phthalate or a mixture of the two.

Many of the materials which are suitable for mounting piezoelectric crystal elements in accordance with this invention will cold-flow with time thereby slightly dislodging the crystal element. In order to reduce the effects of cold-flow and in order to assemble the pickup with the crystal element and its attached stylus assembly accurately in position a harness, illustrated in Fig. 4, is provided. Details of the harness are claimed in application for United States Letters Patent Serial No. 783,114, filed concurrently herewith in the name of Joel A. Burtch, and assigned to the same assignee as the present application, now U. S. Patent No. 2,518,861.

The crystal element assembly, indicated generally by the reference character 23, is shown in detail in Fig. 3. It comprises two plates of piezoelectric crystalline material 25 and 26 connected together and to the leads 27 and 28 to form a multiplate flexing element identified generally by the reference character 29. The crystal element 29 is provided at its top with a saddle element 30 of inverted channel form which is straddled across the thickness of the element. At its bottom end the crystal element is provided with a cradle element 31, also of channel form, within which the lower end of the crystal is firmly held. The center portion 32 of the saddle 30 is raised slightly above the main portion thereof and a pivot 33 extends slightly above the raised portion 32. The bottom channel 31 carries a pivot point 34. From the underneath side of the crystal 31 there extends a downwardly inclined laterally projecting hollow quill 35, the inner end of which is secured to the cradle 31 by sweating or other suitable means, and the cradle carries a projection 37 (Fig. 8) which fits into the end of the hollow quill in order to accurately position the quill. The cradle 31 includes an integrally connected locating member 38 which extends downwardly from one of its ends. The member 38 has a hole in it through which the quill 35 extends, and a drop of solder may be applied to the quill at the location where it extends through the member 38 in order to firmly connect the two together. Thus the quill 35 is firmly connected to and accurately aligned with respect to the crystal element 29.

The sub-assembly comprising the crystal element 29 with its connected quill 35 is mounted in a frame, or harness, which is shown in Fig. 4. The crystal element within the harness is free to rotate but is restrained against movement both lengthwise and laterally to prevent cold-flow of the semi-solid material from dislodging the crystal element and moving the stylus out of its position. The mounting frame comprises two upstanding side portions 40, 41 in the form of flat metal strips having their upper ends 42, 43 inserted through holes 44, 45 in a flat top plate 46 which is made of insulation material. The ends 42, 43 of the metal strips are turned over to connect the top plate 46 to the side legs 40, 41. The base of the harness comprises a pair of superimposed flat circular disks 50, 51 also made of electrical insulation material. The lower ends 47, 48 of the side legs 40, 41 extend downwardly through slots in the upper base disk 50 and then turn and extend outwardly in opposite directions within shallow channels 52, 53 provided in one or both of the opposing faces of the superimposed base disks 50, 51. The lower extremities of the side legs 40, 41 after passing outwardly from between the base disks 50, 51 are turned upwardly to lie substantially parallel to the legs 40, 41 and these upturned extremities 55, 56 constitute conducting tongues through which electrical connection may be made to the leads 27, 28 of the crystal element 29 when the crystal element is mounted within the harness. The two superimposed base disks 50, 51 are connected together by means of a portion of a flat stylus guard member 60 which is formed from a spring material. The end of the stylus guard 60 which lies underneath the base 50, 51 is slotted at 61, 62 to provide three tongues 63, 64, and 65. As may be seen in Fig. 9 the end of each of the tongues 63, 65 is slotted for a short distance at 66 to form two tabs 67, 67' at the end of each of the tongues 63, 65. Tongues 63, 65 extend upwardly through registering slots 68, 69 in the base disks 50, 51 and the two tab portions 67, 67' of each of the tongues are folded over in opposite directions against the upper face of the disk 50 to clamp the two disk portions 50, 51 together thereby firmly holding legs 40, 41 in place. The central tongue portion 64 of the stylus guard 60 is bent upwardly to form an upstanding portion 70 and is then again bent to form a horizontal portion 71. The horizontal portion 71 has a small detent 72 in it and the top plate 46 has a small detent 73 (shown in Fig. 9) located near its center. The crystal assembly shown in Fig. 3 fits into the harness shown in Fig. 4 with the saddle 30 extending substantially perpendicular to the direction of the top plate 46 of the harness. The pivot point 33 fits into the detent 73, and the pivot point 34 fits into the detent 72. Due to the springiness of the stylus guard 60, the tongue portion 64 biases the crystal assembly upwardly against the top plate 46 thereby resiliently holding the crystal sub-assembly in place. It is preferable to resiliently hold the crystal assembly in place by means of a spring urging the crystal assembly upwards against a stiff top member rather than by a spring urging the crystal assembly downwardly against a stiff base as a sudden blow on the stylus arm, such as by dropping the pickup arm onto the stylus will not dislodge the pivot points from the pivots when the former construction is used. The crystal lead 27 is wound around the metal leg 41 and soldered to it, and crystal lead 28 is wound around and soldered to the metal leg 40, as shown in Fig. 9. The quill 35 of the crystal sub-assembly extends in a direction toward the outer end of the stylus guard 60 which is bifurcated to establish two leg portions 80 and 81 with a notch 94 therebetween. Each of the legs at its outer end is dimpled to establish on its lower face a smooth bearing surface 82, 83 and, as is shown best in Fig. 8, each leg is arched upwardly from the main portion of the stylus guard 60.

A canister, or housing, 85 which is deeply cup-shaped is provided. This canister 85 is filled with resiliently yielding crystal-supporting material 18 and the crystal sub-assembly comprising the crystal assembly 23 mounted in its harness is positioned in the canister 85 with the upper disk 50 of the base engaging a narrowed shoulder 86 of the canister and closing the open end of the canister.

The canister 85 is adapted to be connected to a phonograph pickup arm, so in order to assure true alignment of the stylus arm with respect to the pickup arm the stylus arm must be accurately aligned with respect to the canister. The crystal assembly, including the quill 35, is mounted in the frame and a stylus assembly 90 is connected into the quill 35. The deeply cup-shaped canister 85 is filled with liquid material which, when processed, becomes resiliently yielding. While the material 18 is in a liquid state the crystal assembly, in its frame, is pushed into the filled canister until the upper disk 50 of the base engages a narrowed shoulder 86 of the canister. This accurately places the frame with respect to the canister 85. The stylus assembly 90 is firmly held in the notch 94 in the stylus guard thus orienting the crystal 29 with respect to the frame and the stylus with respect to the canister while the material 18 solidifies. The canister 85 is notched at three places 87, 88 and 89 around its lip, and the extremity 55 of the metal leg 40 extends outwardly from the canister 85 through slot 87. When the crystal assembly is in place in the canister 85 the top surface of the leg extremity 55 engages the canister 85, thereby making an electrical contact. This is the ground side of the electrical circuit to the piezo-electric crystal 29, and the canister 85 thereby becomes a grounded electrical shield. The leg extremity 56 extends outwardly from the canister 85 through the slot 89, but is spaced from the canister to prevent electrical contact and the quill 35 extends outwardly from the canister 85 through the slot 88.

The stylus assembly, shown in Fig. 13, is easily replaceable. It comprises a long, thin strip of metal 90 into one end of which is connected a jewel stylus tip 91. The end of the stylus arm 90 opposite the stylus tip 91 is bent slightly as at 92 so that as the stylus arm is pushed into the hollow quill 35 the bend in the arm is flattened to cause it to firmly engage the walls of the quill. This holds the stylus arm into the quill by friction alone, obviating the use of thumb screws and the like and greatly reducing the mass of the stylus assembly. By so mounting the stylus arm in the quill 35 it may easily be replaced. A pull on the stylus arm in a direction substantially parallel to the direction of extension of the quill 35 easily removes the stylus arm from the quill and to replace it with a new one, the new stylus arm is merely pushed back into the quill. The stylus arm 90 is arched slightly at 93, and when the stylus arm is in place in the quill 35 with the stylus tip 91 lying between the legs 80, 81 of the stylus guard 60, the stylus tip 91 projects just slightly below the bearings 82, 83. As is shown in Fig. 8 the arched portion of the stylus arm 90 is located substantially at the point where the stylus arm extends between the legs 80, 81 of the stylus guard 60. When the pickup is not in engagement with the record the stylus arm 90 rests in the notch 94 between the legs 80, 81 thereby holding the stylus arm and preventing cold-flow of material 18 over a period of time from dislodging the stylus. When the pickup is being used to transcribe a record (Fig. 14), the operator lowers the pickup arm supporting the canister 85 until the stylus tip 91 engages the record 96 and supports the unbalanced weight of the pickup arm. This unbalanced weight lifts the stylus arm 90 slightly with respect to the stylus guard 60, thereby releasing the stylus arm 90 from the notch 94 so that the arm can move laterally a limited distance under the influence of the grooves in the phonograph record 96. When the pickup is lifted from the record the stylus arm 90 once more is locked by the notch 94. If the stylus arm is carelessly dropped onto the record the stylus arm 90 bends readily until the smooth bearings 82, 83 at the extremity of the stylus guard 60 hit the record 96. The spring guard 60 is much stiffer than the spring pickup arm and it easily absorbs the force of dropping the pickup arm without damage to itself and, due to the large area of the bearings 82, 83 compared to the small area in the tip of a phonograph stylus, the record is not damaged by the guard. The greater vertical flexibility of the stylus arm allows the stylus 91 to retract under the force of the fall thus preventing damage to the record by the stylus tip. The stylus guard construction is claimed in application for United States Letters Patent Serial No. 783,113, filed concurrently herewith in the name of Francis S. Harris and assigned to the same assignee as the present application, now U. S. Patent No. 2,519,185.

This stylus construction eliminates the usual stylus chuck with its clamping screws. It eliminates soldering operations during the replacing of the stylus and, most important of all, it greatly reduces the stylus assembly weight and consequently the dynamic inertia forces involved when a record is reproduced. The stylus arm assembly shown in Fig. 13 weighs approximately .0015 ounce. The stylus construction is claimed in application for United States Letters Patent Serial No. 783,149, filed concurrently herewith in my name and assigned to the same assignee as the present application.

In the process of assembling the pickup shown in its entirety by Fig. 6 the multiplate crystal assembly 29 is dipped in divinyl neoprene to form on the crystal element a coating which prevents the mounting material 18 from attacking and softening the cement used to secure the two crystal plates 25, 26 together. It also prevents softening of the adhesive used to cement the foil electrodes (not shown) to the major faces of the crystal element 29. Divinyl acetylin neoprene is primarily a mixture comprised of about 60 per cent divinyl acetylin and 40 per cent chloroprene rubber. After dripping the crystal element, excess material is removed and the coating is cured for about an hour at about 90 degrees centigrade. Another coat of divinyl acetylin neoprene is applied to the top and bottom edges of the crystal 29 and the saddle 30 and cradle 31 are slipped onto the edges. The assembly is cured for about 3 hours at 90 degrees centrigrade and is then dipped in cellulose acetate dissolved in acetone containing dimethyl phthalate. This coating protects the divinyl acetylin neoprene coating from the mounting material 18.

The coated crystal assembly is then mounted in the harness shown by Fig. 4 and the sub-assembly so formed with the exception of the stylus guard and stylus is dipped in chloroprene rubber which is then cured for about an hour at about 90 degrees centigrade. This provides on the surface of the crystal subassembly a coating which will stick to the mounting material 18.

The canister 85 is then inverted and is filled with the elastomer which has previously been melted by heating. The coated sub-assembly is then pushed down into the filled cover and the unit is cured for about 15 minutes at a temperature of about 120 degrees centigrade.

A satisfactory elastomer is obtained by copolymerizing polyvinyl chloride and polyvinyl acetate and dispersing the resin so obtained in a plasticizer such as dibutyl phthalate, dioctal phthalate or a mixture of the two. Satisfactory proportions are 90 to 98 per cent polyvinyl chloride and 10 to 2 per cent polyvinyl acetate. It is necessary to heat this elastomer to about 160 degrees centigrade to melt it and its curing temperature is about 120 degrees centigrade. These temperatures preclude the use of Rochelle salt piezoelectric crystal material but satisfactory crystalline materials such as primary ammonium phosphate and some crystals isomorphic therewith are available which will withstand the temperature necessary for fabricating the pickup cartridge.

Another elastomer which is satisfactory for either primary ammonium phosphate or Rochelle salt crystal elements is obtained by copolymerizing polyvinyl chloride and polyvinyl acetate and dispersing the resin so obtained in a plasticizer obtained by mixing in about equal proportions dibutyl phthalate and a petroleum base plasticizer such as Sovaloid C. Sovaloid C is a condensed aromatic hydrocarbon having aliphatic side chains. It mixes well at temperatures slightly above room temperature and does not swell at room temperature. This elastomer sets up into a gel when heated to 48 degrees centigrade for about twelve hours, and, as the temperature is below the critical temperature above which the Rochelle salt loses its water of crystallization it is satisfactory for embedding multiplate elements made of Rochelle salt crystalline material. This latter described material is not quite as good from the standpoint of moistureproofing the crystal element as previously described material. Accordingly, the preferred construction is one utilizing the primary ammonium phosphate crystal element with the better moistureproofing material.

Primary ammonium phosphate does not have the electrical output that Rochelle salt does but by use of the crystal mounting means herein described a primary ammonium phosphate multiplate crystal element 1" x .75" x .038" and of 75 μμfds will generate into an open circuit in excess of 2 volts RMS from the loud passages of normal symphonic recordings.

Other mounting materials having the desired physical characteristics are also available. Plasticized polyvinyl resin such as "Korogel" may be used in several different ways.

It one way a crystal unit of primary ammonium phosphate or the like coated in the previously described manner is inserted into a cannister filled with melted plasticized polyvinyl resin which is then allowed to jell by cooling to room temperature.

Another method of using a plasticized polyvinyl resin which permits the use of a Rochelle salt crystal unit is to fill the canister with the melted resin which is then allowed to cool. The surface of the jell at the open end of the canister is then deeply slit with a sharp instrument and the crystal assembly is pushed into the slot. This method achieves its best results when the crystal element is not mounted in a frame such as is shown in Fig. 4 as it is difficult to push the harness into the solidified gel without damaging it.

In order that the crystal element 29 shall move freely under the influence of driving forces from the stylus system it is important that shear forces in the mounting material 18 be kept to a minimum. These shear forces exist in the semi-solid material between the crystal saddle 30 and the top cross-bar 46 of the frame and between the crystal cradle 31 and the top surface of the base disk 50. In order to reduce the shear force at the top of the crystal element to prevent "locking" of the top edge of the movable crystal element to the stationary frame the saddle 30 is provided with a step 32 between the pivot 33 and the top surface of the saddle. This step 32 spaces the main portion of the saddle sufficiently far away from the cross-bar 46 of the frame that an appreciable depth of the semi-solid material will exist between the saddle and the cross-bar. Because of the appreciable depth of the resiliently yielding material the shear forces produced therein by motion of the crystal element with respect to the harness is kept to a minimum value which does not disturb the operation of the device. The lower edge of the crystal element 29 moves with greater amplitude than the upper edge so it is of even greater importance that high shear forces be prevented in the material 18 which lies between the lower edge of the crystal element 29 and the top face of the base disk 50. This is achieved by providing registering slots 100 in the base disks 50, 51 to accommodate the quill 35 which extends downwardly and outwardly from the center portion of the lower edge of the crystal element 29. The material 18 covers the lower edge of the crystal element 29, as is shown in Fig. 8, and fills the quill slot 100 thereby damping the vibrations of the quill, and because of the relatively large amount of material 18 keeping the shear forces low. In the top surface of the base disk 50 immediately below the back corner 29' of the crystal element 29 there is provided a groove 101 which is filled with material 18. The depth of the material 18 between the cradle 31 and the bottom of the groove 101 is sufficient to prevent high shear forces in the material 18.

From Fig. 8 it will be noted that the lower pivot point 34 is not on the vertical center line of the crystal element 29 but is set back a short distance toward the back corner 29' of the crystal element. If the crystal element were suspended in the mounting material 18 without a harness, low frequency vibrations would cause it to vibrate about a line running from somewhere in the vicinity of the lower back corner 29' of the crystal plate up toward the central portion of the top edge of the crystal plate. As the crystal element vibrated at higher frequencies the lower pivot point would move in toward the vertical center line of the crystal element.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. An electromechanical transducer unit for use over a given range of frequencies, comprising, in combination; a housing; a flexing type transducer element having a drive end and an anchor end within and entirely spaced from said housing; mounting resiliently yielding means including resilient material in engagement with substantially the entire surface area of said transducer element and in engagement with said housing and exerting predominantly a stiffness force against said transducer element as the transducer element vibrates at the lower frequencies within said range, said anchor end of said transducer element being free from rigid engagement to said housing whereby the anchor end of said element may vibrate with respect to said housing; and drive means connected to the drive end of said element and extending through said housing.

2. An electromechanical transducer unit for use over a given range of frequencies, comprising, in combination; a housing; a flexing type transducer element; and transducer element mounting means comprising a mass of resiliently yielding material in engagement with substantially the entire surface area of said element constituting the only means resisting flexing of said element and supporting said element within said spaced from said housing; said material exerting predominantly a stiffness force against said element as said element vibrates at the lower frequencies within said range and exerting predominantly a mechanical resistance force against said transducer element as said transducer element vibrates at the higher frequencies within said range.

3. An electromechanical transducer unit for use over a given range of frequencies, comprising, in combination; a housing; a flexing type transducer element; and transducer element mounting means comprising only a mass of resilient material in engagement with substantially the entire surface area of said element and supporting said element with and spaced from said housing; said material exerting predominantly a stiffness force against said element as said element vibrates at the lower frequencies within said range and exerting predominantly a mechanical resistance force against said transducer element as said transducer element vibrates at the higher frequencies within said range.

4. An electromechanical transducer unit for use over a given range of frequencies, comprising, in combination; a housing; a flexing type transducer element; a harness connected to said housing and engaging said transducer element at two spaced apart points to prevent translatory motion thereof and to permit substantially free rotational motion thereof about an axis extending between said two points and to hold said transducer element spaced from said housing; a mass of resiliently yielding material within said housing and in engagement with said transducer element to resiliently resist flexural motion of said transducer element; and drive means connected to said transducer element and extending outside said housing for flexing said transducer element with respect to said resilient material.

5. An electromechanical transducer unit for use over a given range of frequencies, comprising in combination; a housing; a flexing type transducer element having a drive end portion and a rear end portion within and entirely spaced from said housing; drive means connected to the drive end of said element and extending outside said housing; and mounting means for resiliently anchoring the rear end portion of said element, said mounting means having stiffness less than the stiffness of said transducer element as said transducer element vibrates at a frequency within said given range of frequencies up to about 700 cycles per second and comprising a torsion wire connected to the rear end portion of said element and a mass of material in engagement with substantially the entire surface area of said element.

6. In an electromechanical transducer unit for use over a given range of frequencies, a housing, a flexing type multiple plate electromechanical transducer element within said housing and having a front drive end and having a back end free from rigid engagement with said housing, driving means connected to the drive end of said element and extending through said housing and adapted to drive and/or to be driven by said element, and resiliently yielding mounting means within said housing in engagement with substantially the entire surface area of said element and comprising means exerting predominantly a resiliently yielding stiffness force against the flexing of said element at the lower frequencies within said range.

7. In an electromechanical transducer, a flexing type transducer element, a housing around said element, transducer element harness means in engagement with said housing and in engagement with said element to support said element away from the walls of said housing and to prevent lateral displacement of said element with respect to said housing, said harness means exerting substantially no force against the flexing of said element, a mass of resiliently yielding material within said housing and in engagement with said element for resiliently resisting the flexing of said element, and driving means connected to said element and extending through said housing.

8. The invention set forth in claim 7, further characterized by said housing comprising a cup-shaped portion and a closure portion secured to the open end of said cup-shaped portion, and characterized by said transducer element harness means comprising a substantially rigid frame secured to said closure portion and having a cross-bar extending over the top edge of said transducer element, pivotal connection means between the top edge of said transducer element and the said cross-bar of said rigid frame, and pivotal connection means between the bottom edge of said transducer element and the said closure portion of said housing.

9. In a phonograph pickup, a flexing type electromechanical transducer element having an axis of flexure, a housing including a cup-shaped portion and a closure portion secured to the cup-shaped portion to close the open end thereof; supporting means connected to said closure portion and comprising a pair of spaced apart side arms one end of which is connected to said closure portion, said arms extending into the said cup-shaped portion and a cross-bar secured to the other end of each of said arms, said crossbar including first pivot means and said closure portion carrying second pivot means; said element being suspended between said first and said second pivot means; and resiliently yielding means within said housing in engagement with said housing and said element for resiliently holding said element against flexure.

10. In a phonograph pickup, a flexing type piezoelectric crystal element adapted to generate an electrical signal upon being flexed, a housing enclosing said crystal element, harness means connected to said housing and including first and second pivot means engaging said crystal element respectively on first and second opposite edges of the crystal element to prevent lateral movement of said crystal element with respect to said housing yet to permit substantially free vibration of said crystal element about an axis extending between said two point means, driving means connected to said second edge of said crystal element and extending exteriorily of said housing for vibrating said crystal element around said axis, and resiliently yielding means within said housing in engagement with said element resiliently resisting said vibration of said crystal element whereby said crystal element is flexed.

11. The invention set forth in claim 10, further characterized by means resiliently urging said second pivot means against said crystal element, said first pivot means being rigidly connected to said housing.

12. In a phonograph pickup, a flexing type piezoelectric crystal element adapted to generate an electric signal upon being flexed; a housing comprising a cup-shaped portion and a closure portion secured in a position to close the open end thereof; crystal element harness means connected to said closure portion and extending into the said cup-shaped portion, said harness means comprising a pair of spaced apart side arms one end of which is connected to said closure portion and a cross-bar secured to the other end of each of said arms, said cross-bar comprising the top pivot support for said crystal element; crystal element driving means connected to said crystal element and extending through said housing to the exterior thereof; guard means connected to said closure portion for guarding a portion of said drive means outside said housing, a portion of said guard means extending through said closure portion into the interior of said housing and forming the lower pivot support for said crystal element; and resiliently yielding means within said housing in engagement with said crystal element for resiliently resisting flexure of said crystal element under driving forces transmitted by said driving means.

13. In a phonograph pickup, a cup-shaped housing portion and a closure portion secured in position to close the open end of the cup-shaped portion, harness means connected to said closure portion and positioned within said housing, said harness means comprising a frame having a cross-bar which is a first pivot support, a second pivot support connected to said closure portion of said housing, flexing type of piezoelectric crystal element means mounted between said first and said second pivot supports for substantially free rotary motion and having a motion transmitting portion extending outwardly through said housing, and a mass of resiliently yielding material within said housing and in contact with a substantial area of the surface of said crystal element for resiliently resisting the flexing of said crystal element.

14. In an electromechanical transducer unit for use over a given range of frequencies, housing means, a flexing type electromechanical transducer adapted to be stressed about an axis to generate an electromotive force, harness means connected to said housing means and engaging said transducer substantially only on said axis for supporting said transducer substantially only against lateral motions with respect to said housing means, resiliently yielding material within said housing means substantially entirely covering said transducer, and drive means connected to said transducer for actuating said transducer about said axis, said drive means extending outside said housing means.

THOMAS E. LYNCH.

REFERENCES CITED

The following references are of record in the file of this patent:

UNITED STATES PATENTS

| Number | Name | Date |
|---|---|---|
| Re. 20,680 | Sawyer | Mar. 29, 1938 |
| 1,495,429 | Nicolson | May 27, 1924 |
| 1,831,787 | Goudy | Nov. 10, 1931 |
| 2,222,056 | Williams | Nov. 19, 1940 |
| 2,313,129 | Dohan | Mar. 9, 1943 |
| 2,363,497 | Begun | Nov. 28, 1944 |
| 2,386,692 | Kuenstler | Oct. 9, 1945 |
| 2,405,226 | Mason | Aug. 6, 1946 |
| 2,463,109 | Jaffe | Mar. 1, 1949 |
| 2,476,414 | Hutter | July 19, 1949 |
| 2,479,894 | Andrews | Aug. 23, 1949 |
| 2,480,535 | Alois et al. | Aug. 30, 1949 |
| 2,480,907 | Dally | Sept. 6, 1949 |
| 2,485,137 | Brown et al. | Oct. 18, 1949 |
| 2,492,446 | Schumann | Dec. 27, 1949 |
| 2,518,861 | Burtch | Aug. 15, 1950 |
| 2,519,185 | Harris | Aug. 15, 1950 |

FOREIGN PATENTS

| Number | Country | Date |
|---|---|---|
| 399,231 | Great Britain | Oct. 5, 1933 |